6587X
S. Jinkham,
Washing Machine,
Patented June 13, 1831.
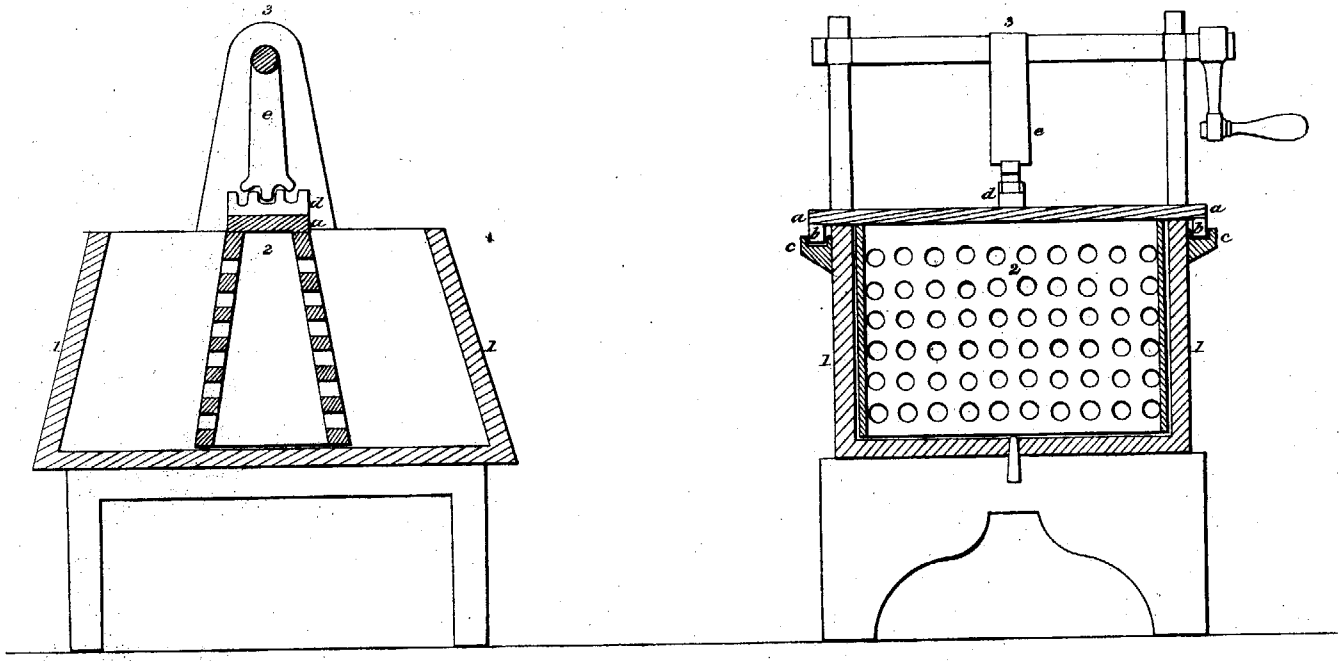
N. PETERS, PHOTO-LITHOGRAPHER, WASHINGTON, D. C.

June 13, 1831 6587X 30/.

Samuel Pinkham.

Letters Patent.

The schedule referred to in these Letters Patent and making part of the same containing a description in the words of the said Samuel Pinkham himself of his improvement in the washing machine.

It consists of three principle parts, the Chest or Receiver of the clothes; the Dasher; and lever or handle. The following size and proportion are assumed in the model herewith sent.

1. The Receiver. This is made of inch boards, twenty two inches in length at bottom; fifteen at top; sixteen in width; & eleven in height. the inclination of the ends favours the operation. The clothes being pressed against the ends; and in that position when the Dasher recedes the clothes naturally fall over, & change their position.

The bottom, sides, and ends may be let in, by grooves, & confined by screws. In this the water or suds, and the clothes are put. The water may be drawn off at bottom.

2d. The Dasher or press. This is made of thinner boards, hollow, four inches wide at top, & eight at bottom; thus shaped in order to correspond with the inclination of the ends of the Receiver; made like a box without a bottom, perforated with a sufficient number of holes to enable the water or suds, to pass & repass freely through it. This is placed, crosswise, in the Receiver, and extends across the same; and of the same height. On the top of this & of the same width is confined a plank. each end of which, extending over is confined, by tenons or dovetails to a slider, on each side. on the top of the Receiver. These sliders play in grooves made in hard wood, & fastened to the sides of the Receiver, near the top. On the top of the Dasher, on this plank, crosswise is fixed a rack, or plane with four cogs or teeth. 3d. The lever or handle. This is placed perpendicularly, & hangs on an axle eight inches & a half above the dasher — the axle turns on pivots, in two standards, or ears; one on each out side of the receiver; & there confined; and extended high enough for that purpose.

The lower end of this lever is flattened, is semicircular, & indented with three teeth or cogs, uniting with and playing in, the Rack. so that

6587X by working the lever, in this manner, the dasher, whose office is to squeeze and press the clothes, is moved alternately from one end of the receiver to the other, pressing against the clothes; & the water or suds, also alternately, escaping, through the holes in the dasher to the side opposite the pressure, The most convenient quantity of clothes, for this size of machine, is one sheet & two shirts, on each side; and in that proportion.

Remarks, The size and proportion may be varied at pleasure, The shape of the Machine also, and the application of the power may be varied.

The ends of the receiver may be Semicircular in which case, the sides of the dasher ought to be also semicircular corresponding with the Receiver.

The Dasher may be of two parts, moving and passing alternately by each other, like a fulling mill. in which case a small variation would be necessary, in the moving power.

The Dasher may be moved by a crank; & this crank, turned by water, steam, or any other adequate power, The lever, for ease of working, may be moved by means of a handle or cross on the top end like a T or a staff may be fixed to the top of the levers, by a loose joint; by which the levers may be worked, in the form of a double lever. Or it may be operated by children, old or infirm people.

The sliders may be made to run on rollers. This Machine will save half the labour of washing; it saves much, by not wearing the clothes in washing or injuring them. It is as convenient about house as a wash tub, may be accommodated to a small or large washing. The construction is simple & less expensive, than any other mode known.

Enfield Massachusetts March 14th 1831.

Witnesses

William Kellogg Jr.

Samuel S. Dickinson

Samuel Pinkham 810 rds